(12) United States Patent
Harris et al.

(10) Patent No.: US 6,985,991 B2
(45) Date of Patent: Jan. 10, 2006

(54) BRIDGE ELEMENT ENABLED MODULE AND METHOD

(75) Inventors: Jeffrey M. Harris, Chandler, AZ (US); Robert Tufford, Chandler, AZ (US); Malcolm Rush, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 402 days.

(21) Appl. No.: 10/151,454

(22) Filed: May 20, 2002

(65) Prior Publication Data

US 2003/0217217 A1    Nov. 20, 2003

(51) Int. Cl.
G06F 3/00 (2006.01)
G06F 13/42 (2006.01)
G06F 13/36 (2006.01)

(52) U.S. Cl. .......... 710/306; 710/105; 710/20
(58) Field of Classification Search ........ 710/105, 710/11, 306
See application file for complete search history.

(56) References Cited

U.S. PATENT DOCUMENTS

| | | | | |
|---|---|---|---|---|
| 5,414,814 A | * | 5/1995 | McKim | 710/1 |
| 5,796,963 A | * | 8/1998 | Odom | 710/310 |
| 6,175,889 B1 | * | 1/2001 | Olarig | 710/309 |
| 6,418,504 B2 | * | 7/2002 | Conway et al. | 710/313 |
| 6,651,112 B1 | * | 11/2003 | Reichel | 710/20 |
| 6,757,762 B1 | * | 6/2004 | McCarthy et al. | 710/105 |

OTHER PUBLICATIONS

Mike Mclleland, Bridging the Gap between Present and Furuee System Architectures. A PCI/VME Solution for Space, Coretech 2000.*
Ben Shafari, General Micro Systems Releases VMEbus-To-PCI Bridge, Jan. 9, 2001, www.tmcnet.com/enews/010901m.htm.*
Richard Grigonis, Turorial: The Bridges of CPCI and VME, Apr. 1, 2000, www.cconvergence.com.*
Buddy Walls et al, Leveraging Flight Heritage of new Compact PCI Space Systems: A Fusion of Architectures, presentation in 2000, Southwest Research Institute, San Antonio, Tx.*
Product News Network, General Micro Systems First to Offer VMEbus PowerPC CPU Board with Galileo Bridge and 2eSST,Mar. 15, 2002.*
General Micro Systems,V191 Atlantis, Mar. 26, 2002.*
Tundra, Universe II (CA91C142), 1996.*

* cited by examiner

Primary Examiner—Rehana Perveen
Assistant Examiner—Christopher Daley
(74) Attorney, Agent, or Firm—Kevin D. Wills (57) ABSTRACT

In a computer system, a bridge element enabled module (102) includes a bridge element (106) that communicates with a communications network using a protocol (130) selected from a group of protocols (105) including an 2eSST protocol (480). The bridge element enabled module (102) also includes a first host element (180) coupled to the bridge element (106), with the bridge element (106) conirnunicating with the first host element (108) using one a PCI-X based protocol (128) and a switched point-to-point protocoi (132)

30 Claims, 5 Drawing Sheets

BRIDGE ELEMENT ENABLED MODULE AND METHOD

BACKGROUND OF THE INVENTION

In current high-speed data networks, such as multi-service platform systems, numerous protocols are used on the host and on the network side of individual modules. In such systems, it is desirable to move large amounts of data between modules with maximum speed and efficiency while maintaining compatibility between newer modules and older modules. In prior art multi-service platform systems, bridging elements between host and network side of the modules bridged primarily the Peripheral Component Interconnect PCI protocol on the host side and older versions of VERSAmodule Eurocard (VMEbus) protocols on the network side. With newer protocols available on both the host and network side, more efficient and versatile bridging elements are desirable. In addition, prior art bridging chips are not always backward compatible to support legacy module devices and protocols found in many multi-service platform systems.

Accordingly, there is a significant need for an apparatus and method that overcomes the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the prevent invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other Rather, in particular embodiments, "connected" may be used to indicate that two or more elements are in direct physical or electrical contact However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Figure 1:
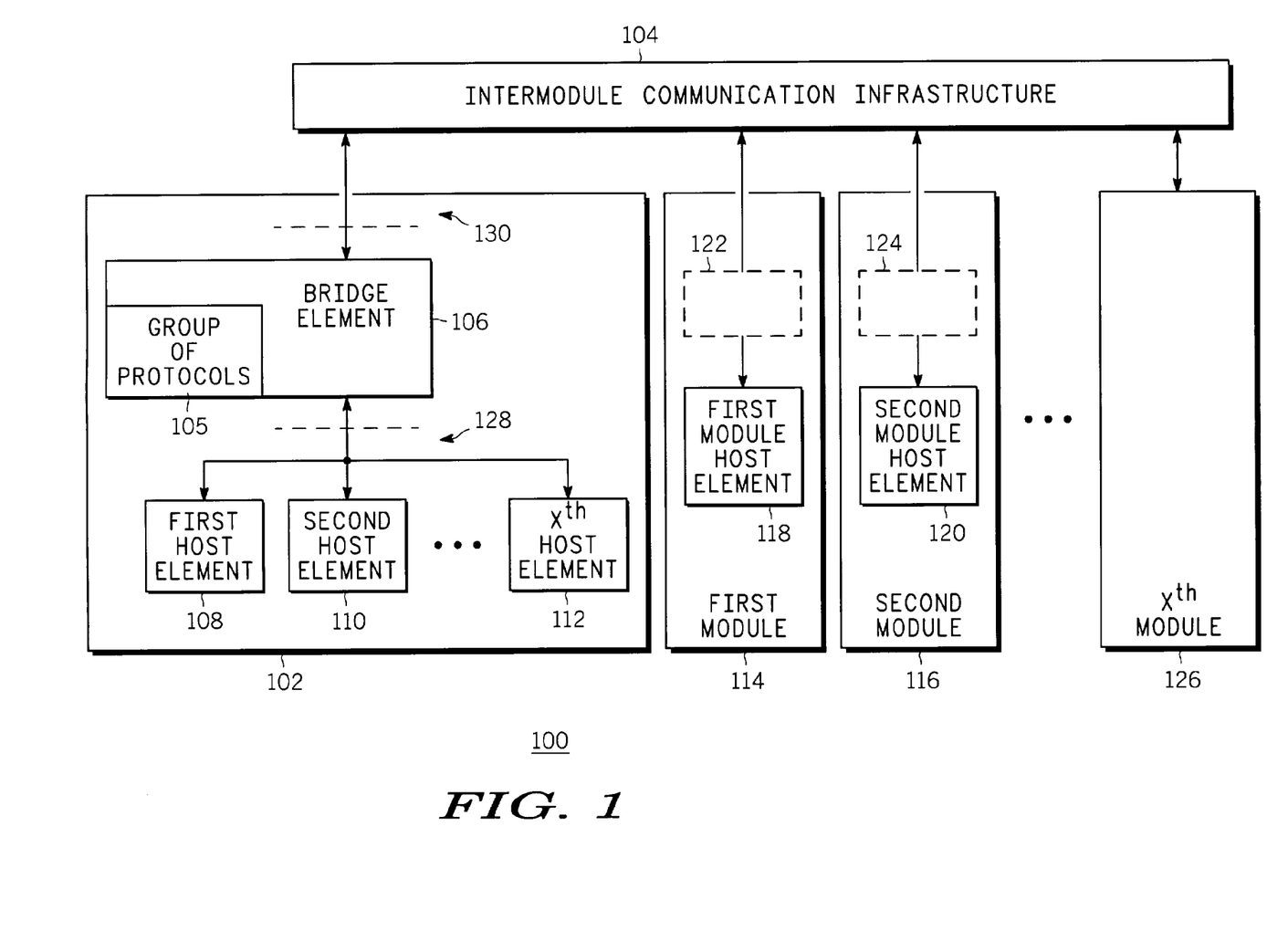
FIG. 1 depicts a multi-service platform system according to one embodiment of the invention.

FIG. 1 depicts a multi-service platform system 100 according to one embodiment of the invention. A multi-service platform system 100 can include one or more computer chassis, with software and any number of slots for inserting modules. Modules can add functionality to multi-service platform system 100 through the addition of processors, memory, storage devices, and the like. In one embodiment a backplane connector is used for connecting modules placed in the slots. As an example of an embodiment, a multi-service platform system can include model MVME5100 manufactured by Motorola Computer Group, 2900 South Diablo Way, Tempe, Ariz. 85282. The invention is not limited to this model or manufacturer and any multi-service platform system is included within the scope of the invention.

Multi-service platform system 100 can include any number of modules coupled to intermodule communication infrastructure 104. Modules can include bridge element enabled module 102, first module 114, second module 116 and any number of other modules supported in the chassis as represented by the Xth module 126. Intermodule communication infrastructure 104 can include hardware and software necessary to implement a high-speed data network using parallel multi-drop or switched point-to-point topologies and protocols. An example of a parallel multi-drop topology is a VERSAmodule Eurocard (VMEbus) system using any of the VMEbus protocols known in the art.

Multi-service platform system 100 is controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more modules with communication among the various modules of multi-service platform system 100 occurring via intermodule communication infrastructure 104. Platform controller also controls the functionality of multi-service platform system 100 including managing any modules placed in the slots of the chassis to add functionality to the multi-service platform system 100.

Bridge element enabled module 102 includes bridge element 106, which can be hardware and/or software to provide an interface between host elements on the bridge element enabled module 102 and intermodule communication infrastructure 104. Bridge element enabled module 102 can include any number of host elements, for example first host element 108, second host element 110, and any number of other host elements as represented by the Xth host element 112. Each host element is coupled to communicate with bridge element 106. Bridge element 106 is coupled to communicate with intermodule communication infrastructure 104. Host elements can include, without limitation, processors, memory modules, storage devices, input/output (I/O) devices, and the like.

In the embodiment shown in FIG. 1, host elements are coupled to bridge element 106 and communicate with bridge element 106 through a parallel multi-drop network, which can use for example, a Peripheral Interconnect-X (PCI-X) based protocol 128. In an embodiment of the invention, PCI-X based protocols 128 can include both PCI and PCI-X2 protocols. Bridge element 106 is capable of communicating with first host element 108, second host element 110 and Xth host element 112 using any variant of the PCI-X based protocol 128. Examples of variants of PCI-X protocols 128, without limitation, include 133 MHz 64-bit PCI-X, 100 MHz 64-bit PCI-X down to 66 MHz 32 bit PCI-X, and the like. Bridge element 106 can also communicate with first host element 108, second host element 110 and Xth host element 112 using any variant of older PCI based protocols (a subset of PCI-X based protocols 128), for example and without limitation, 66 MHz 64-bit PCI down to 33 MHz 32-bit PCI, and the like.

Bridge element 106 allows bridge element enabled module 102 to communicate with first module 114, second module 116 and Xth module 126 via the intermodule communication infrastructure 104 using protocol 130. In an embodiment of the invention, bridge element 106 uses a protocol 130 selected from group of protocols 105, which can include any of the VMEbus based protocols. In an embodiment of the invention, VMEbus based protocols can include, but are not limited to, Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). These VMEbus protocols are known in the art.

First module 114 can have one or more host elements analogous to those described above for bridge element enabled module 102, one of which is represented by first module host element 118. First module 114 can also be configured with a bridge element thereby becoming bridge element enabled (as represented in FIG. 1 by including dashed box 122). First module 114 can also lack a bridge element (by not including dashed box 122), and be non-bridge element enabled. The significance of being bridge element enabled and non-bridge element enabled is discussed with reference to FIG. 4 below. Analogously, second module 116 includes any number of host elements as represented by second module host element 120 and can be either bridge element enabled (by including dashed box 124) or non-bridge element enabled (by not including dashed box 124).

Figure 2:
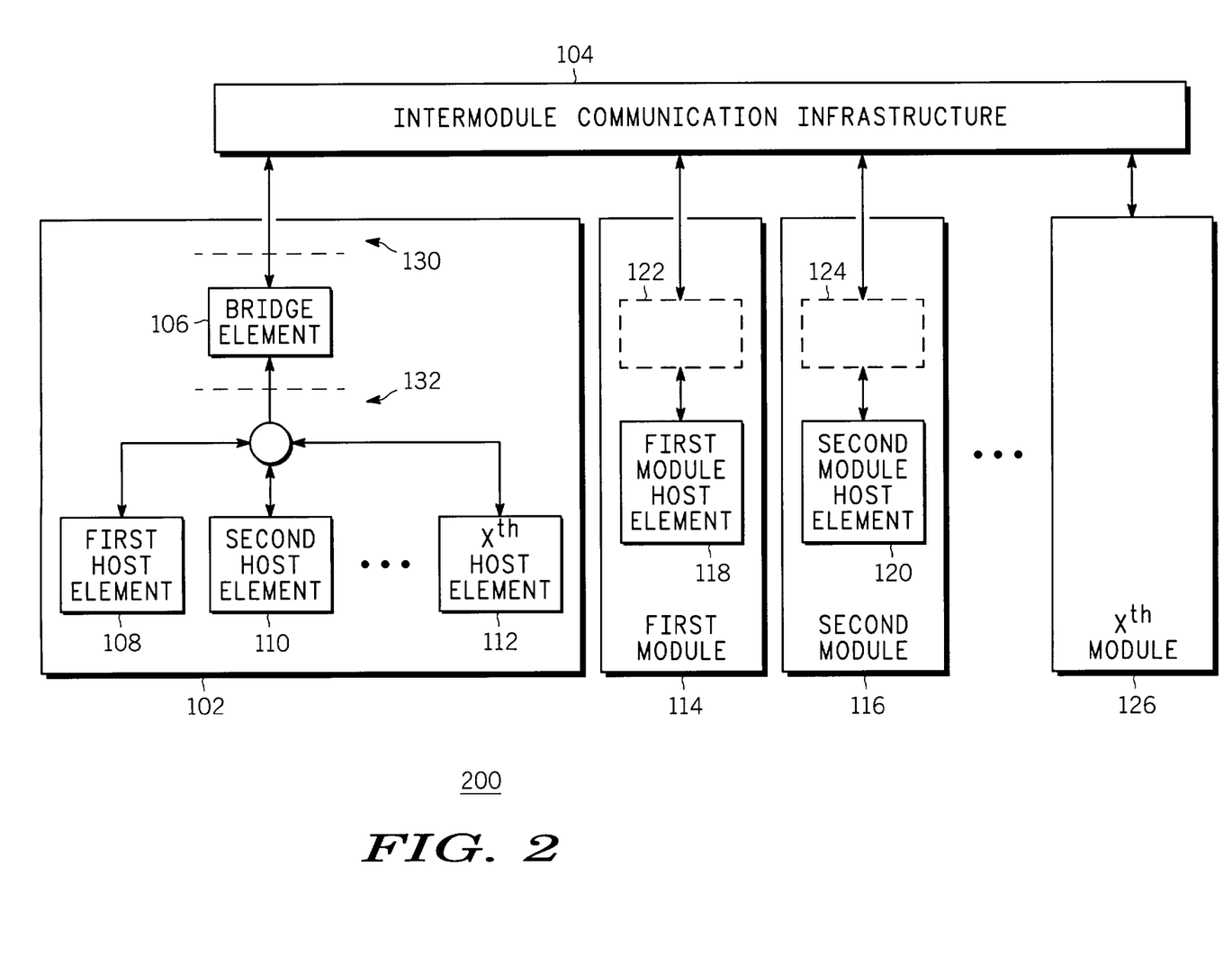
FIG. 2 depicts a multi-service platform system according to another embodiment of the invention.

FIG. 2 depicts a multi-service platform system 200 according to another embodiment of the invention. As shown in FIG. 2, bridge element enabled module 102 includes a switched point-to-point protocol 132 and network coupling first host element 108, second host element 110 and Xth host element 112 to bridge element 106. Switched point-to-point protocol 132 can include, for example and without limitation, RapidIO, Serial RapidIO, 3GIO, Infiniband, Hypertransport, and the like.

Figure 3:
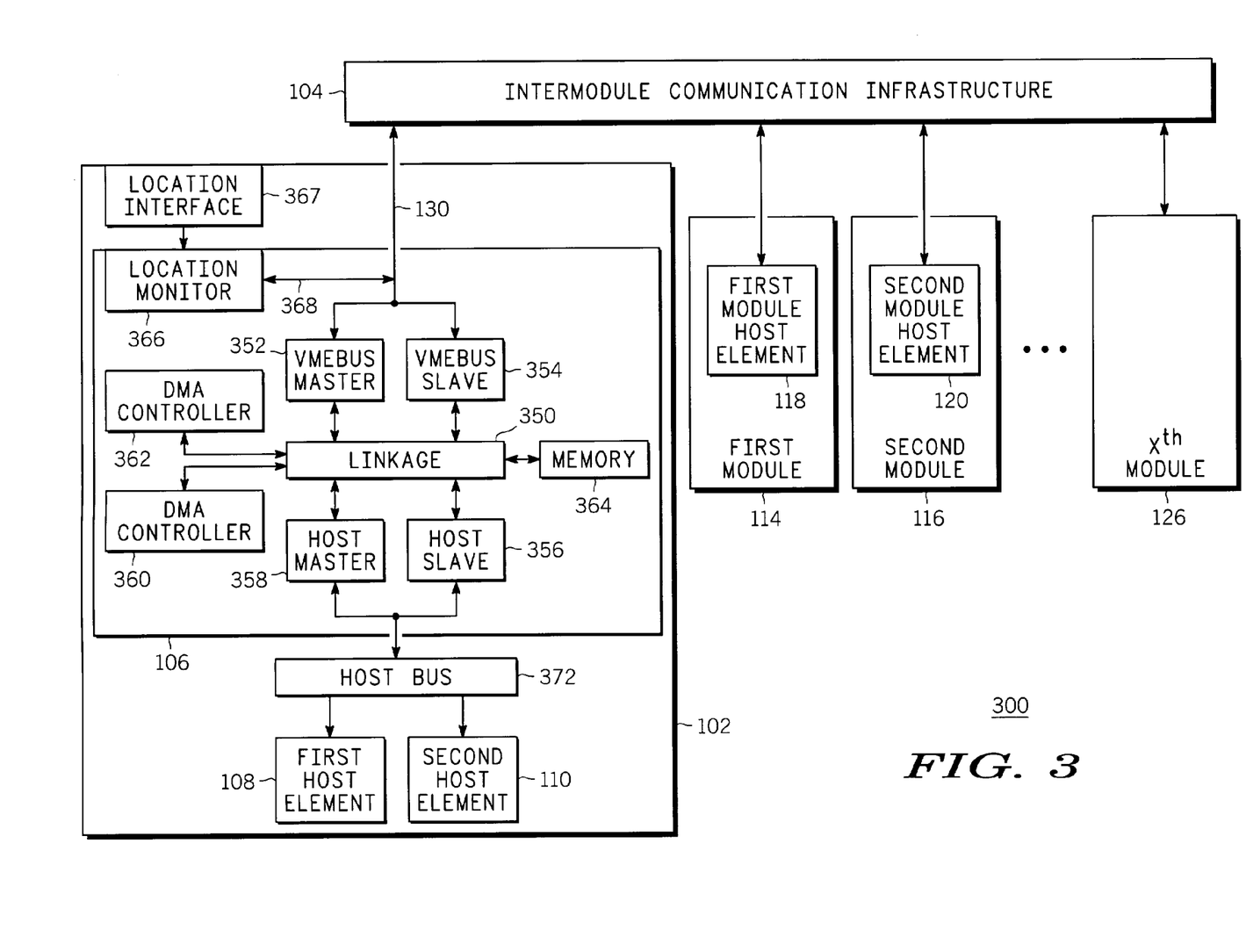
FIG. 3 depicts a multi-service platform system according to yet another embodiment of the invention.

FIG. 3 depicts a multi-service platform system 300 according to yet another embodiment of the invention. As shown in FIG. 3, bridge element 106 is shown coupled to host bus 372, where host bus 372 represents either parallel multi-drop bus with PCI-X protocol 128 of FIG. 1 or switched point-to-point protocol 132 of FIG. 2. Xth host element 112 has been omitted from FIG. 3 for clarity. In other words, bridge element 106 can communicate with first host element 108 and second host element 110 using either PCI-X based protocol 128 or switched point-to-point protocol 132 depending on the design of the host side of bridge element enabled module 102. Either topology along with its associated protocols is within the scope of the invention.

Also shown in FIG. 3 are various components of bridge element 106. Linkage 350 is used to interconnect functions provided by bridge element 106 and provide a common interface for other elements of bridge element 106. In one embodiment of the invention, linkage 350 has five ports including VMEbus, Host bus, two Direct Memory Access (DMA) controller ports, and one memory port. The number of ports for linkage 350 is not limiting of the invention and a linkage 350 with any number of ports is within the scope of the invention.

The host master 358 and host slave 356 can be hardware and/or software elements that operate to interface host bus 372 to intermodule communication infrastructure 104 and its associated group of protocols 105. In one embodiment, host master 358 and host slave 356 can be PCI master and PCI slave respectively when host bus 372 uses a PCI-X based protocol 128. In another embodiment, host master 358 and host slave 356 can be switched point-to-point master and slave respectively when host bus 372 uses switched point-to-point protocol 132.

In an example of an embodiment of the invention, when host bus 372 uses PCI-X based protocol 128, host slave 356 is responsible for tracking and maintaining coherency to the host bus 372 protocols, which can include PCI-X based protocols, 32-bit and 64-bit data transfers and 32-bit and 64-bit addresses. The host slave 356 supports configuration cycles to PCI configuration registers and memory space access, through first-in-first-out (FIFO) methodology to linkage 350. Host master 358 provides the interface between linkage 350 and host bus 372. Host master 358 in this embodiment supports PCI-X based protocols, 32-bit and 64-bit data bus and 32-bit and 64-bit address bus.

The VMEbus master 352 and VMEbus slave 354 can be hardware and/or software elements that operate to interface intermodule communication infrastructure 104 to host bus 372 and it's associated protocols. The VMEbus slave tracks and maintains coherency to the group of protocols 105, which can be VMEbus protocols. VMEbus slave 354 supports SCT, BL,T, MBLT, 2eVME and 2eSST protocols. VMEbus master 352 provides the interface between linkage 350 and intermodule communication infrastructure 104, which can be a VMEbus. VMEbus master 352 also supports SCT, BLT, MBLT, 2eVME and 2eSST protocols.

Memory 364 is coupled to linkage 350, and can include, but is not limited to, random access memory (RAM), read only memory (ROM), flash memory, electrically erasable programmable ROM (EEPROM), and the like. Memory 364 can contain stored instructions, tables, data, and the like, to be utilized by a processor (not shown for clarity). In an embodiment of the invention, memory 364 can comprise control registers for bridge element 106. Control registers can include, for example and without limitation, PCI Configuration Space registers (PCFS), Local Control and Status registers (LCSR), Global Control and Status registers (GCSR) and Configuration Control and Status registers (CR/CSR).

PCFS registers are PCI registers defined in the PCI standards. LCSR registers contain control and status registers, which include inbound and outbound map decoder registers, DMA controller registers, interrupt control registers. GCSR registers include control bits, which allow information to be passed between host elements on other modules and first host element 108 on bridge element enabled module 102. CR/CSR registers are defined in the VME64 standard.

Location monitor 366 is coupled to location interface 367. Location interface 367 communicates the location 368 of bridge element enabled module 102 within multi-service platform system 100 to location monitor 366 on bridge element 106. Location interface 367 can be, for example, module slot identification pins. When bridge element enabled module 102 is placed in a slot in multi-service platform system 100, location interface 367 communicates the location 368 of bridge element enabled module 102 to bridge element 106 via location monitor 366. Bridge element 106 further communicates location 368 to the platform controller of multi-service platform system 300 via intermodule communication infrastructure 104. As such, platform controller of multi-service platform system 300 knows that a specific type of bridge element enabled module 102 is located in a particular slot of multi-service platform system 100. In another embodiment of the invention, bridge element 106 can also broadcast location 368 of bridge element enabled module 102 directly to other modules in multi-service platform system 300, such as first module 114, second module 116 and Xth module 126.

In an embodiment of the invention, bridge element 106 has DMA controllers 360, 362. DMA controllers 360, 362 can move data among host elements of multi-service platform system 300 without intervention by a processor (not shown for clarity). With the processor freed from involvement in the data transfer, overall the speed of multi-service platform system 300 is increased. In the embodiment shown in FIG. 3, bridge element 106 has two DMA controllers 360, 362. However, any number of DMA controllers is within the scope of the invention. Also, either one of DMA controllers 360, 362 can perform the functions listed below.

In an embodiment of the invention, there are two operating modes for DMA controllers 360, 362: direct mode and linked-list mode. In direct mode, DMA controllers 360, 362 are programmed directly by a processor (not shown), with the data subsequently transferred per the commands programmed by the processor. In linked-list mode, DMA controllers 360, 362 execute a list of commands stored in memory 364. The list of commands can be retrieved using the host bus and executed on a FIFO basis. If DMA controllers 360, 362 are to transfer data using the intermodule communication infrastructure 104, each of the commands to transfer data includes a protocol 130 to be selected from group of protocols 105 for data transfer on the intermodule communication infrastructure 104. In effect, bridge element 106 selects protocol 130 from group of protocols 105 in order to transfer data over the intermodule communication infrastructure 104. Protocol 130 can be selected to correspond to any other module in multi-service platform system 300 to which bridge element enabled module 102 is to transfer data. The selection of a protocol can be based on the capabilities of the module that data is to be transferred to. For example, if first module 114 is to receive data from DMA controllers 360, 362, and first module 114 can only communicate using BLT protocol, then DMA controllers 360; 362 and bridge element 106 can transfer data using BLT protocol.

DMA controllers 360, 362 can transfer data among the various host elements of multi-service platform system 300. In one embodiment, DMA controllers 360, 362 can move data between first host element 108 and second host element 110 on bridge element enabled module 102. In effect, first host element 108 and second host element 110 can move data between each other using DMA controllers 360, 362 on bridge element 106. This has particular application when first host element 108 and second host element 110 do not have their own DMA controllers.

In another embodiment, DMA controllers 360, 362 can move data between first host element 108 and first module host element 118. In this embodiment, bridge element 106 can include in the command to transfer data, protocol 130 selected from group of protocols 105 for moving data over intermodule communication infrastructure 104. Protocol 130 can be selected to correspond to a VMEbus protocol used by first module 114 as described above.

In yet another embodiment, DMA controllers 360, 362 can move data between first module 114 and second module 116. In effect, data is moved between first module 114 and second module 116 using DMA controllers 360, 362 located on bridge element 106 within bridge element enabled module 102. In this embodiment, bridge element 106 can select protocol 130 from group of protocols 105 to move data between first module 114 and second module 116. Protocol 130 can be selected to correspond to a VMEbus protocol used by both first module 114 and second module 116. This operation is particularly advantageous where neither first module 114 nor second module 116 has their own DMA controllers. In still yet another embodiment, DMA controllers 360, 362 can be used to move data between two host elements on a module other than bridge element enabled module 102.

Figure 4:
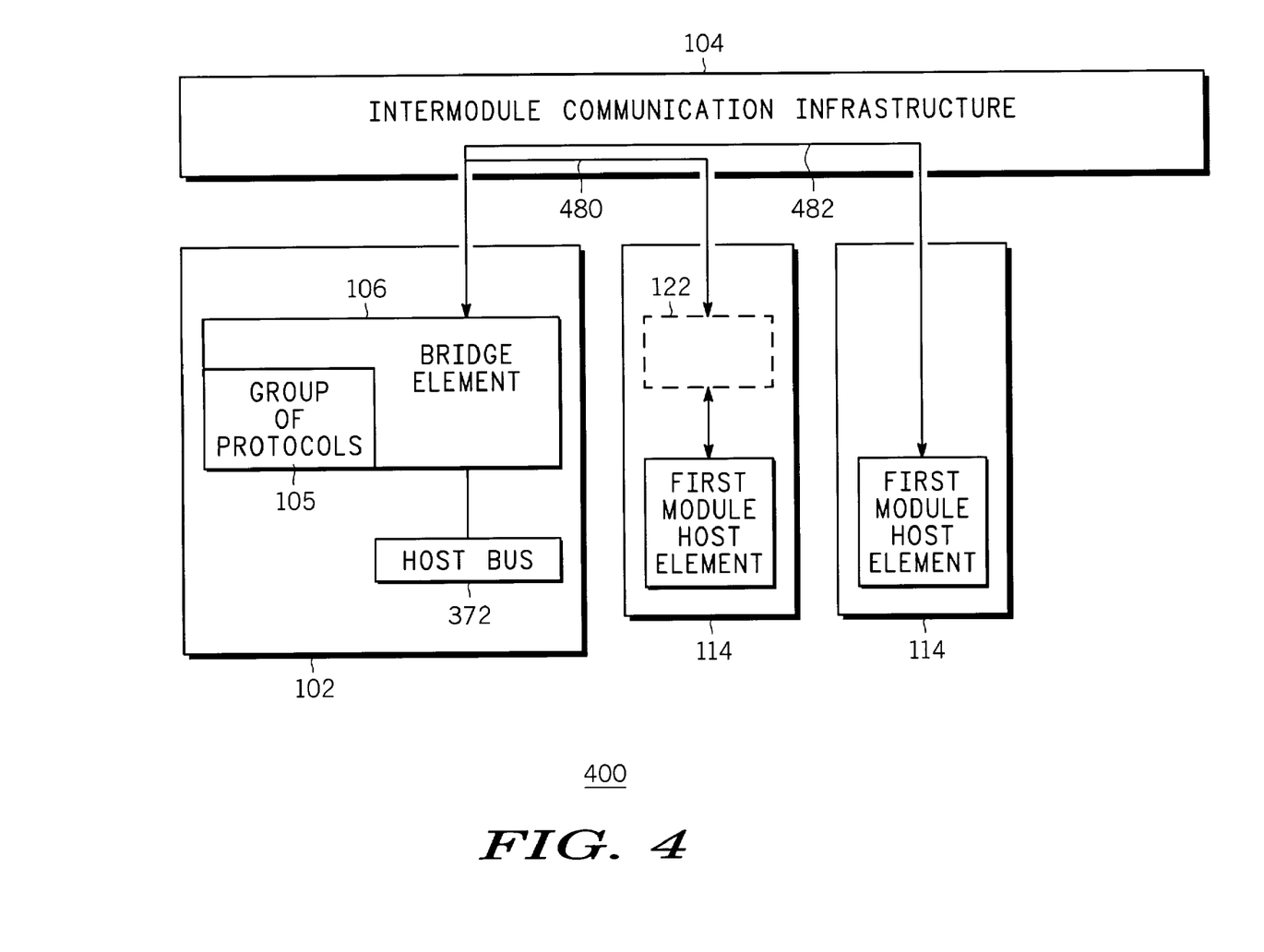
FIG. 4 depicts a multi-service platform system according to still another embodiment of the invention.

FIG. 4 depicts a multi-service platform system 400 according to still another embodiment of the invention. As shown in FIG. 4, bridge element enabled module 102 can communicate with first module 114 via intermodule communication infrastructure 104, with first module 114 having either of two different configurations. First module 114 can be either bridge element enabled as represented by the inclusion of dashed box 122, or non-bridge element enabled as represented by a lack of dashed box 122. Bridge element enabled can mean that first module 114 includes a bridge element analogous to bridge element 106 included with bridge element enabled module 102. Non-bridge element enabled can mean that first module 114 does not include a bridge element in its architecture. This generally includes older modules installed in multi-service platform system 400 known as legacy modules.

Bridge element 106 of bridge element enabled module 102 operates to communicate with intermodule communication infrastructure 104, including first module 114, using protocol 130 selected from group of protocols 105 including the 2eSST protocol 480. If first module 114 is bridge element enabled, then bridge element enabled module 102 communicates with first module 114 via intermodule communication infrastructure 104 using 2eSST protocol 480. In other words, bridge element 106 selects 2eSST protocol 480 from group of protocols 105 to use in communication between bridge element enabled module 102 and first module 114.

If first module 114 is non-bridge element enabled, then bridge element enabled module 102 communicates with first module 114 via intermodule communication infrastructure 104 using protocol selected to correspond to first module 482. In other words, bridge element 106 selects protocol from group of protocols 105 to use in communication between bridge element enabled module 102 and first module 114. Protocol selected to correspond to first module 482 can include any VMEbus protocol used by first module 114. In an embodiment of the invention, protocol selected to correspond to first module 482 can include any VMEbus protocol that first module 114 is designed to use, which generally includes VMEbus protocols older than 2eSST, for example and without limitation, SCT, BLT, MBLT and 2eVME protocols. In an embodiment of the invention, if first module 114 is capable of communicating using more than one VMEbus protocol, then a protocol can be selected such that data transfer occurs in any other optimal manner, such as fast, efficient, and the like.

Figure 5:
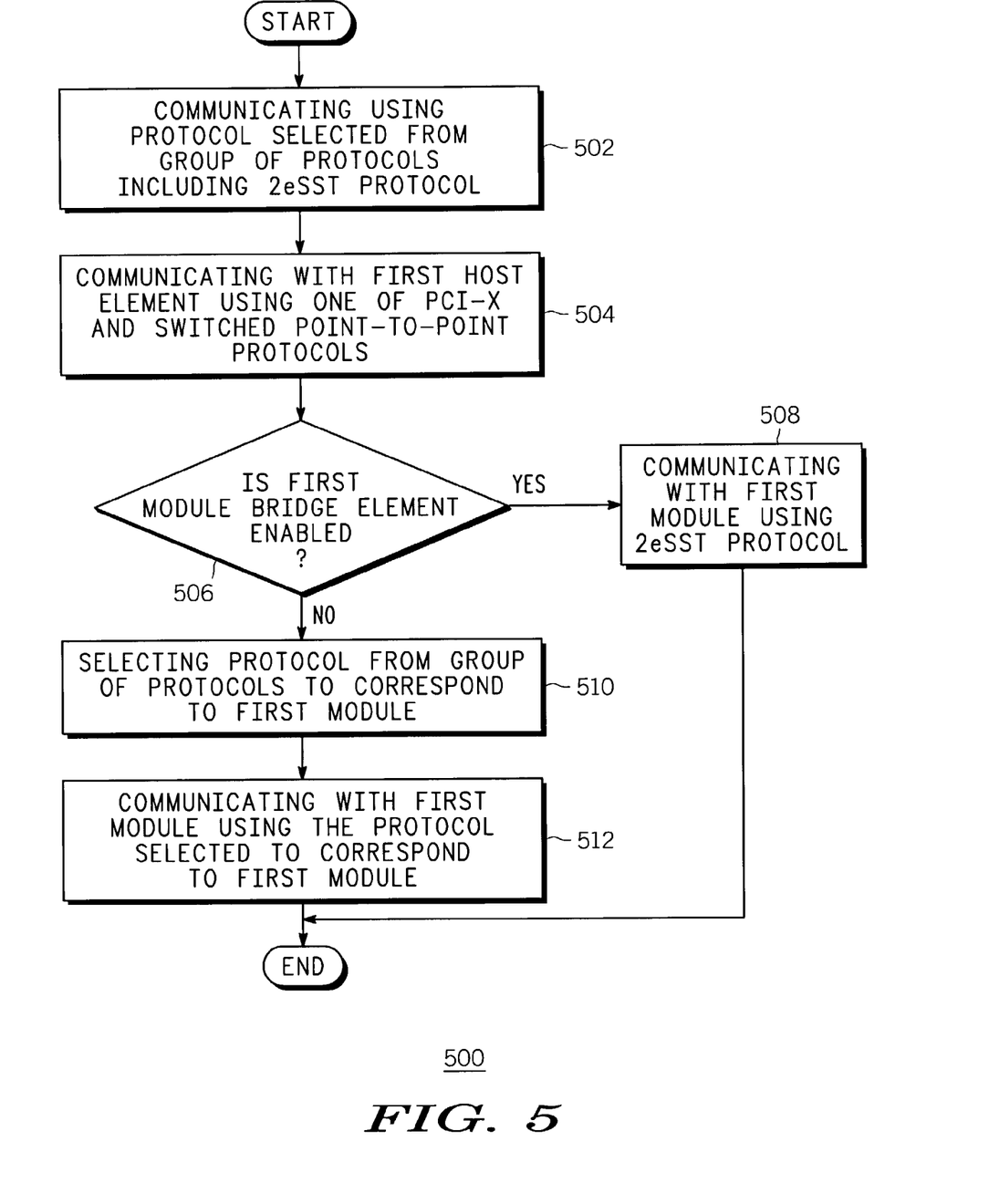
FIG. 5 illustrates a flow diagram of a method of the invention according to an embodiment of the invention.

FIG. 5 illustrates a flow diagram 500 of a method of the invention according to an embodiment of the invention. In step 502, bridge element 106 coupled to bridge element enabled module 102 is communicating with intermodule communication infrastructure 104 using protocol 130 selected from group of protocols 105 including 2eSST protocol 480. Bridge element can also communicate with other modules of multi-service platform system 100, such as first module 114 and second module 116 using protocol 130 selected from group of protocols 105 including 2eSST protocol 480.

In step 504, bridge element 106 is communicating with first host element 108 that is coupled to bridge element 106 using one of a PCI-X based protocol 128 and a switched point-to-point protocol 132. In step 506 it is determined if first module 114 is bridge element enabled. If so, bridge element 106 communicates with first module 114 via intermodule communication infrastructure 104 using 2eSST protocol 480 per step 508. If first module 114 is non-bridge element enabled, then bridge element 106 selects protocol from group of protocols to correspond to first module 482 per step 510. Then bridge element 106 communicates with first module 114 via intermodule communication infrastructure 104 using the protocol selected to correspond to the first module 482 per step 512. As described above, protocol selected to correspond to first module 482 can be a VMEbus protocol selected to correspond to a VMEbus protocol used by first module 114.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. A bridge element enabled module coupled to an intermodule communication infrastructure, the bridge element enabled module comprising:
   a bridge element, wherein the bridge element communicates with the intermodule communication infrastructure using a protocol selected from a group of protocols including an 2eSST protocol; and
   a first host element coupled to the bridge element, wherein the bridge element communicates with the first host element using a PCI-X based protocol and a switched point-to-point protocol.

2. The bridge element enabled module of claim 1, wherein the group of protocols are VMEbus protocols.

3. The bridge element enabled module of claim 1 wherein the bridge element communicates with the intermodule communication infrastructure using one of SCT, BLT, MBLT, 2eVME, and 2eSST protocols.

4. The bridge element enabled module of claim 1, the bridge element further comprising a DMA controller.

5. The bridge element enabled module of claim 4, wherein the DMA controller moves data between the first host element and a second host element coupled to the bridge element enabled module.

6. The bridge element enabled module of claim 4, wherein the DMA controller moves data between the first host element and a first module host element.

7. The bridge element enabled module of claim 4, wherein the DMA controller moves data between a first module and a second module.

8. A multi-service platform system, comprising:
   an intermodule communication infrastructure;
   a bridge element enabled module having a bridge element, wherein the bridge element communicates with the intermodule communication infrastructure using a protocol selected from a group of protocols including an 2eSST protocol; and
   a first host element coupled to the bridge element, wherein the bridge element communicates with the first host element using a PCI-X based protocol and a switched point-to-point protocol.

9. The multi-service platform system of claim 8, wherein the intermodule communication infrastructure is a VMEbus.

10. The multi-service platform system of claim 8, wherein the group of protocols are VMEbus protocols.

11. The multi-service platform system of claim 8, wherein the bridge element communicates with the intermodule communication infrastructure using one of SCT, BLT, MBLT, 2eVME, and 2eSST protocols.

12. The multi-service platform system of claim 8, further comprising a first module, wherein if the first module is bridge element enabled, then the bridge element communicates with the first module via the intermodule communication infrastructure using the 2eSST protocol.

13. The multi-service platform system of claim 8, further comprising a first module, wherein if the first module is non-bridge element enabled, then the bridge element communicates wit the first module via the intermodule communication infrastructure using the protocol selected to correspond to the first module.

14. The multi-service platform system of claim 13, wherein the protocol is selected to correspond to a VMEbus protocol used by the first module.

15. The multi-service platform system of claim 8, wherein the bridge element comprises a DMA controller.

16. The multi-service platform system of claim 15, wherein the DMA controller moves data between the first host element and a second host element coupled to the bridge element enabled module.

17. The multi-service platform system of claim 15, wherein the DMA controller moves data between the first host clement and a first module host element.

18. The multi-service platform system of claim 15, wherein the DMA controller moves data between a first module and a second module.

19. The multi-service platform system of claim 8, further comprising a location monitor coupled to the bridge element wherein the location monitor communicates a location of the bridge element enabled module within the multi-service platform system to the bridge element, and wherein the bridge element broadcasts the location to the multi-service platform system.

20. A method of operating a multi-service platform system, comprising:
   providing an intermodule communication infrastructure;
   providing a bridge element enabled module having a bridge element and a first host element;
   the bridge element communicating wit the intermodule communication infrastructure using a protocol selected from a group of protocols including an 2eSST protocol; and
   the bridge element communicating with the first host element using a PCI-X based protocol and a switched point-to-point protocol.

21. The method of claim 20, wherein the group of protocols are VMEbus protocols.

22. The method of claim 20, wherein the bridge element communicating with the intermodule communication infrastructure comprises the bridge element communicating with the intermodule communication infrastructure using one of SCT, BLT, MBLT, 2eVME, and 2eSST protocols.

23. The method of claim 20, further comprising if a first module is bridge element enabled, the bridge element communicating with the first module via the intermodule communication infrastructure using the 2eSST protocol.

24. The method of claim 20, further comprising if a first module is non-bridge element enabled, then the bridge element selecting the protocol from the group of protocols to correspond to the first module.

25. The method of claim 24, further comprising communicating with the first module via the intermodule communication infrastructure using the protocol selected to correspond to the first module.

26. The method of claim 24, further comprising selecting the protocol to correspond to a VMEbus protocol used by the first module.

27. The method of claim 20, further comprising the bridge element comprising a DMA controller, and wherein the DMA controller moving data between the first host element and a second host element coupled to the bridge enabled module.

28. The method of claim 20, further comprising the bridge element comprising a DMA controller and wherein the DMA controller moving data between the first host element and a first module host element.

29. The method of claim 20, further comprising the bridge element comprising a DMA controller, and wherein the DMA controller moving data between a first module and a second module.

30. The method of claim 20, further comprising:
   a location monitor communicating a location of the bridge element enabled module within the multi-service platform system to the bridge element; and
   the bridge element broadcasting the location to the multi-service platform system.

* * * * *